No. 824,219. PATENTED JUNE 26, 1906.
F. S. DI VITO & A. MEYN.
NUT LOCK.
APPLICATION FILED FEB. 17, 1906.
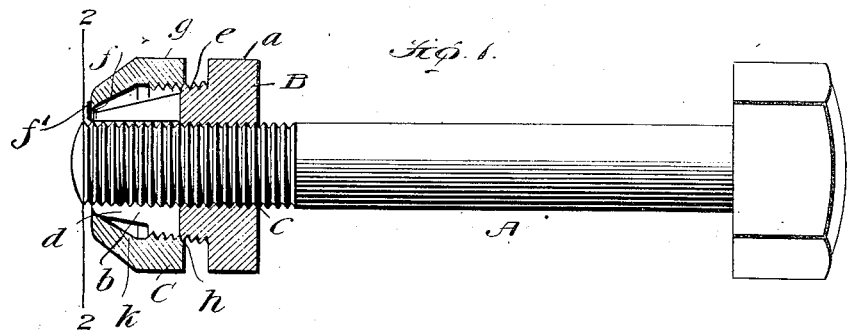
Fig. 1.
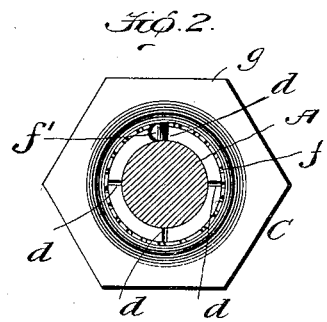
Fig. 2.
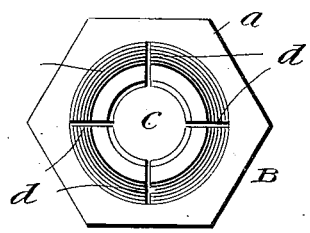
Fig. 3.
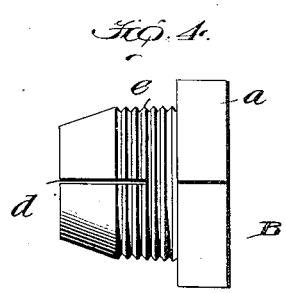
Fig. 4.
Fig. 5.
Witnesses
W. C. Healy
Inventors
Franck S. di Vito +
Anthony Meyn
By James Sheely
Attorney

UNITED STATES PATENT OFFICE.

FRANCK SCORSONE DI VITO AND ANTHONY MEYN, OF NEW ORLEANS, LOUISIANA.

NUT-LOCK.

No. 824,219.  Specification of Letters Patent.  Patented June 26, 1906.

Application filed February 17, 1906. Serial No. 301,667.

*To all whom it may concern:*

Be it known that we, FRANCK SCORSONE DI VITO, a subject of the King of Italy, and ANTHONY MEYN, a citizen of the United States, residing at New Orleans, in the parish of Orleans and State of Louisiana, have invented new and useful Improvements in Nut-Locks, of which the following is a specification.

Our invention pertains to that class of nut-locks in which a surrounding washer is employed to compress a portion of a nut, and thereby set or lock the nut on a bolt; and it consists in the compact, durable, and efficient nut-lock hereinafter described, and particularly pointed out in the claim appended.

In the accompanying drawings, forming part of this specification, Figure 1 is a longitudinal section of our novel nut-lock. Fig. 2 is a transverse section taken in the plane indicated by the line 2 2 of Fig. 1. Fig. 3 is an end elevation of the nut removed. Fig. 4 is a side elevation of the nut. Fig. 5 is a perspective view of the key removed.

Similar letters designate corresponding parts in all of the views of the drawings, referring to which—

A is a threaded bolt of the conventional or any other construction suitable to the purpose of our invention.

B is the nut of our improvements, and C is the washer for coöperating with and setting or locking the nut on the bolt.

As best shown in Figs. 1 and 4, the nut B comprises an angular portion $a$, whereby it may be readily turned through the medium of a wrench or the like, a reduced taper or conical portion $b$ at one side of the angular portion, and a longitudinal central threaded bore $c$, extending from end to end of the nut and designed to receive and engage the bolt A, as shown. The taper or conical portion $b$ of the nut is split longitudinally at four (more or less) equidistant points, as indicated by $d$, and between said portion $b$ and the angular portion $a$ is an inner threaded part $e$, as illustrated, for a purpose which will presently appear. The slits $d$ preferably extend into the threaded part $e$, as shown. The washer C comprises an exterior angular portion $g$, so that it may be readily turned on and off the nut through the medium of a wrench, a threaded bore $h$, straight in conformity to the threaded portion $e$ of the nut, and a taper bore $k$, arranged to engage the taper portion $f$ of the nut, said taper bore $k$ being of course plain or smooth. In its outer end said washer C is provided with notches $f$ for a purpose presently set forth.

D is a taper key for locking the washer C to the nut B and preventing casual turning of the former on the latter. The said key is designed to be arranged in one of the slits $d$ of the nut B, with its inclined edge outward, and have its outer end seated in one of the notches $f$ of washer C and turned against the end of said washer, as indicated by $f'$ in Figs. 1 and 2.

In the practice of our invention the nut B is formed of steel or analogous material, and hence the sections of the reduced and split portion are possessed of more or less resiliency. From this it follows that when the nut is positioned on the bolt and the washer C is turned up on the reduced portion of the nut the threaded portion $h$ of the washer coöperating with the threaded portion $e$ of the nut will serve to connect the washer and nut. It will also be noted that after the washer is turned up to a considerable extent on the threaded reduced part of the nut the plain tapered bore $k$ of the washer will come into engagement with the plain taper end of the reduced portion of the nut, with the result that the ends of the nut-sections formed by the slits $d$ will be positively pressed inwardly toward the longitudinal center of the bolt A and locked to said bolt, so that casual movement of the nut on the bolt is precluded. In this connection it will be observed that the ends of the sections formed by the slits $d$ are not pressed inwardly against the bolt until the washer C is almost entirely on the reduced portion $b$ of the nut. This being so, the nut with the washer thereon may be turned in the usual manner to the position desired on the bolt, and then by turning the washer through a part of a revolution the nut may be set or locked on the bolt.

The key D is arranged in one slit $d$ of nut B after the nut is placed in position on the bolt and before the washer C is placed on the nut. Then after the nut and washer are positioned as described in the foregoing, the key is drawn outward as far as possible to seat it in one of the notches $f$ of the washer C and is bent against the end of the washer, as best shown in Fig. 2, so as to lock the washer to the nut and prevent casual turning of the former. When it is desired to release the washer C, the key D is first straightened and then pushed back in the nut until it clears the notches f' of the washer.

Having described our invention, what we claim, and desire to secure by Letters Patent, is—

In a nut-lock, the combination of a bolt, a nut mounted thereon and having an exteriorly-threaded inner part and an outer plain and tapered part and also having one or more longitudinal slits, a washer surrounding said parts of the nut and having interior threads arranged to engage the threaded part of the nut and a taper bore arranged to engage the taper part of the nut and also having notches in its end, and a taper key arranged in the slit of the nut and seated in one of the notches of the washer and having its end turned against the end of the washer.

In testimony whereof we have hereunto set our hands in presence of two subscribing witnesses.

FRANCK SCORSONE DI VITO.
ANTHONY MEYN.

Witnesses:
GEORGE R. MEYN,
GEO. W. KENDALL.